United States Patent [19]
Tanaka et al.

[11] Patent Number: 5,579,423
[45] Date of Patent: Nov. 26, 1996

[54] OPTICAL FIBER LASER DEVICE

[75] Inventors: Akio Tanaka, Chiba; Toru Hirano, Hamamatsu; Takuya Kohno, Tokyo; Masami Ohsawa, Saitama-ken, all of Japan

[73] Assignees: Lederle (Japan), Ltd., Tokyo; Hamamatsu Photonics K.K., Shizuoka-ken; Moritex Corp., Tokyo, all of Japan

[21] Appl. No.: 508,449

[22] Filed: Jul. 28, 1995

[30] Foreign Application Priority Data

Aug. 3, 1994 [JP] Japan ................................ 6-211662

[51] Int. Cl.⁶ ............................................ G02B 6/00
[52] U.S. Cl. .................................. 385/35; 385/147
[58] Field of Search ..................... 385/31, 35, 49, 385/16, 50, 84; 606/13

[56] References Cited

U.S. PATENT DOCUMENTS

| | | | |
|---|---|---|---|
| 4,649,151 | 3/1987 | Dougherty et al. | 514/410 |
| 4,660,925 | 4/1987 | McCaughan, Jr. | 385/39 |
| 4,676,231 | 6/1987 | Hisazumi et al. | 128/6 |
| 4,693,556 | 9/1987 | McCaughan, Jr. | 385/147 |
| 4,735,677 | 4/1988 | Kawachi et al. | 156/633.1 |
| 4,740,047 | 4/1988 | Abe et al. | 385/31 |
| 4,750,799 | 6/1988 | Kawachi et al. | 385/49 |
| 4,985,029 | 1/1991 | Hoshino | 385/31 |
| 5,361,316 | 11/1994 | Tanaka et al. | 385/39 |
| 5,380,318 | 1/1995 | Daikuzono | 385/16 |

OTHER PUBLICATIONS

Verdaasdonk et al., "Physical Properties of Sapphire Fibretips for Laser Angioplasty", *Lasers in Medical Science*, vol. 2:183, 1987, pp. 183–188.

Prince et al., "Ball-Tipped Fibers for Laser Angioplasty with the Pulsed-Dye Laser", *IEEE Journal of Quantum Electronics*, vol. 26, No. 12, Dec. 1990, pp. 2297–2304.

*Primary Examiner*—Akm E. Ullah
*Attorney, Agent, or Firm*—Wenderoth, Lind & Ponack

[57] ABSTRACT

A plane side of a semispherical lens is opposed to an end of optical fibers for guiding a pulse laser beam, and a semispherical lens is disposed in a predetermined spaced relation.

1 Claim, 6 Drawing Sheets

0.1mm 0.35mm

F I G. 7
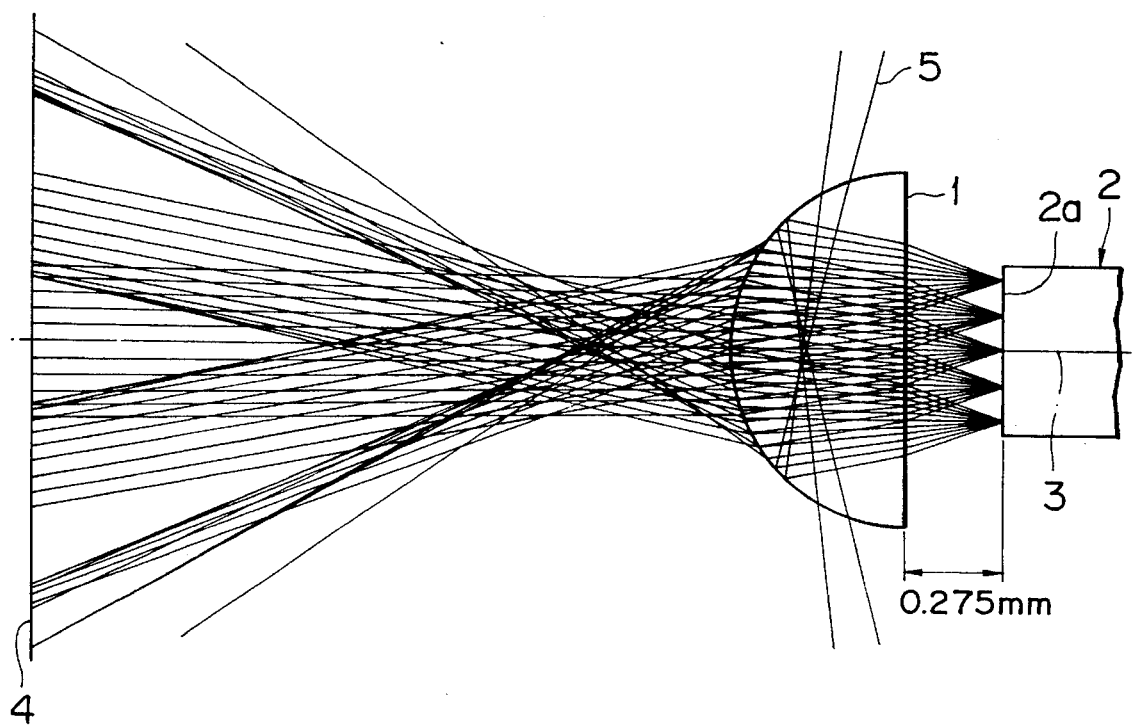
0.275mm
F I G. 8
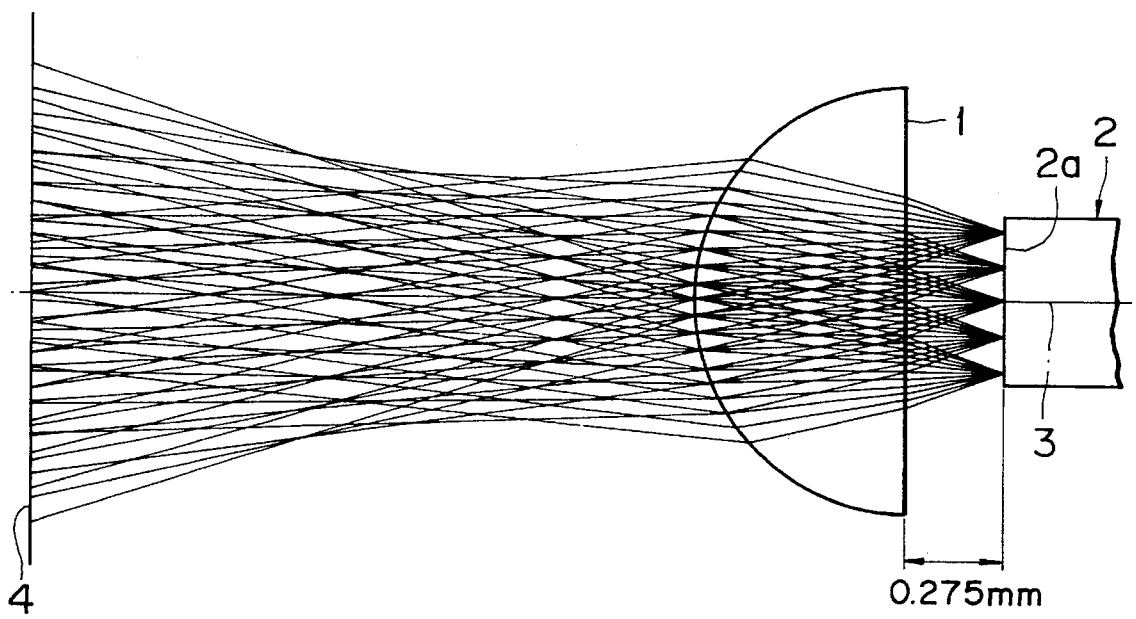
0.275mm 0.275mm 0.275mm

OPTICAL FIBER LASER DEVICE

BACKGROUND OF THE INVENTION AND PRIOR ART

The present invention relates to an optical fiber laser conducting device used for a therapy using laser beams (rays) guided by optical fibers, particularly used for a laser dynamic therapy for early cancer called a photodynamic therapy (PDT).

A therapeutic method for cancer utilizing the light and heat effect of laser, particularly the laser dynamic therapy for early cancer known as the photodynamic therapy is performed by permitting laser beams generated by a laser generator incident on a guiding portion of optical fibers, that is, on a core portion making use of an optical system, and guiding and applying the laser beams to the affected parts within the body such as lung, gullet, stomach, uterus, bladder and the like making use of bending properties of the optical fibers.

In this case, it is often that the introduction of the optical fibers into the affected parts is carried out in such a manner that the optical fibers are inserted through a forceps of an endoscope, and a laser irradiation to the affected parts is carried out while being observed by a doctor.

It is often that the laser beams generally used comprise pulse wave in order to enhance the efficiency. In this case, an irradiation dose of laser beams is expressed by the product of a laser output per pulse (joule/pulse), frequency of pulses (pulse/second) and time (second or minute). The irradiation dose of laser beams is an important factor in therapy.

In many cases, an optical system called a "tip" adjusted to the shape of the affected part is mounted at the extreme end of the optical fibers from which laser beams go out in order to effectively apply the laser beams to the affected part.

One form of the above tip is of a forward direct type, in which case there gives rise to one problem in an evenness of a pattern of laser strength over the whole area from a center portion to a peripheral portion of a laser spot irradiated and projected to the forward affected part, as is apparent from the above explanation of the irradiation dose of the laser beams.

Even in prior arts, for example, a laser device using a spherical lens at the tip as disclosed in Japanese Utility Model Application Laid-Open No. 6(1994)-8910 publication, and a laser device using a cylindrical GRIN lens at the tip made by Nippon Sheet Glass Co., Ltd. known as a "SELFOC Lens", the necessity of the evenness of the pattern of the laser outgoing strength of the forward direct type has been aware of.

These prior arts have both merits and demerits such that they are expensive, that the evenness of the pattern of irradiated laser pattern is unsatisfactory, that when a focal point is concentrated on a specific portion within the lens due to the reflection within the lens of an impulse wave of a pulse laser, the lens has a possibility of being broken, and that contaminations of the tip generated by the scattering or evaporation of body fluids caused by the laser wave during the therapy is difficult to clean and remove.

SUMMARY OF THE INVENTION

It is a first object of the present invention to provide an optical fiber laser device having an optical tip of a laser guiding probe of a forward direct type which is high in evenness of a laser outgoing pattern.

It is a second object of the present invention to prevent the concentration of a focal point due to the internal reflection within the lens in the tip of the impulse wave of a pulse laser and a breakage resulting therefrom. Another object of the present invention is to easily clean and remove the contaminations of the tip of the optical fiber laser device and to provide inexpensive products for the market.

The present invention has been accomplished for the purpose of achieving the aforementioned objects. There is provided an arrangement wherein a laser outgoing end of optical fibers whose diameter of a laser guiding portion (core) is d is disposed on a center optical axis on the plane side of a semispherical lens having a diameter D, which is formed of a material which is transparent with respect to a wavelength of a laser beam used and of which refractive index $n_d$ is less than 1.6 so that a spacing L therebetween is $0.35 \geq L \geq 0.2$ mm, and the relationship between the diameter D of said semispherical lens and the diameter d of the laser guiding portion (core) is $D/d \geq 2.5$.

BRIEF DESCRIPTION OF THE DRAWINGS

FIG. 7 is a computer graphic view showing a light outgoing pattern in the case of a refractive index $n_d$ of a semispherical lens outside of scope of the present invention.

FIG. 8 is a computer graphic view of a light outgoing pattern of a further optical fiber laser device within a scope of the present invention.

DESCRIPTION OF THE PREFERRED EMBODIMENTS

Figure 1:
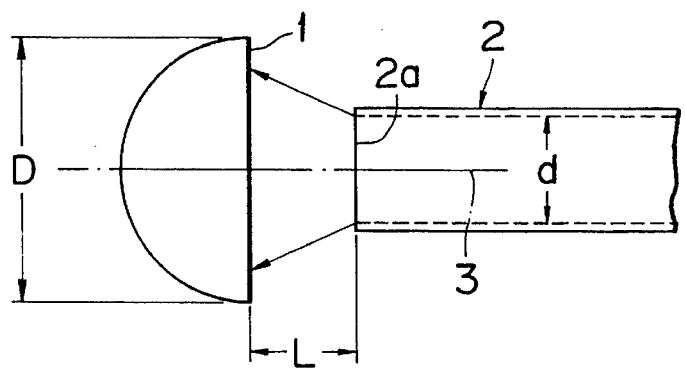
FIG. 1 is a schematic sectional view of assistance in explaining a basic construction of the present invention.

FIG. 1 shows a basic construction of the present invention. A laser outgoing end 2a of optical fibers 2 whose diameter of a laser guiding portion (core) is d is disposed on a center optical axis 3 on the plane side of a semispherical lens 1 having a diameter D, which is formed of an inorganic or organic material which is transparent, that is, not absorptive, in a wavelength band of a laser beam used and of which refractive index $n_d$ is less than 1.6 so that a spacing L therebetween is $0.35 \geq L \geq 0.2$ mm, and the relationship between the diameter D of said semispherical lens 1 and the diameter d of the laser guiding portion, that is, the core, is $D/d \geq 2.5$.

For the purpose of showing the function and effect of an optical fiber laser probe according to the present invention, FIGS. 2 to 10 show distribution patterns of laser beam outgoing strength in case of simulations conducted by a computer with particulars varied.

Figure 2:
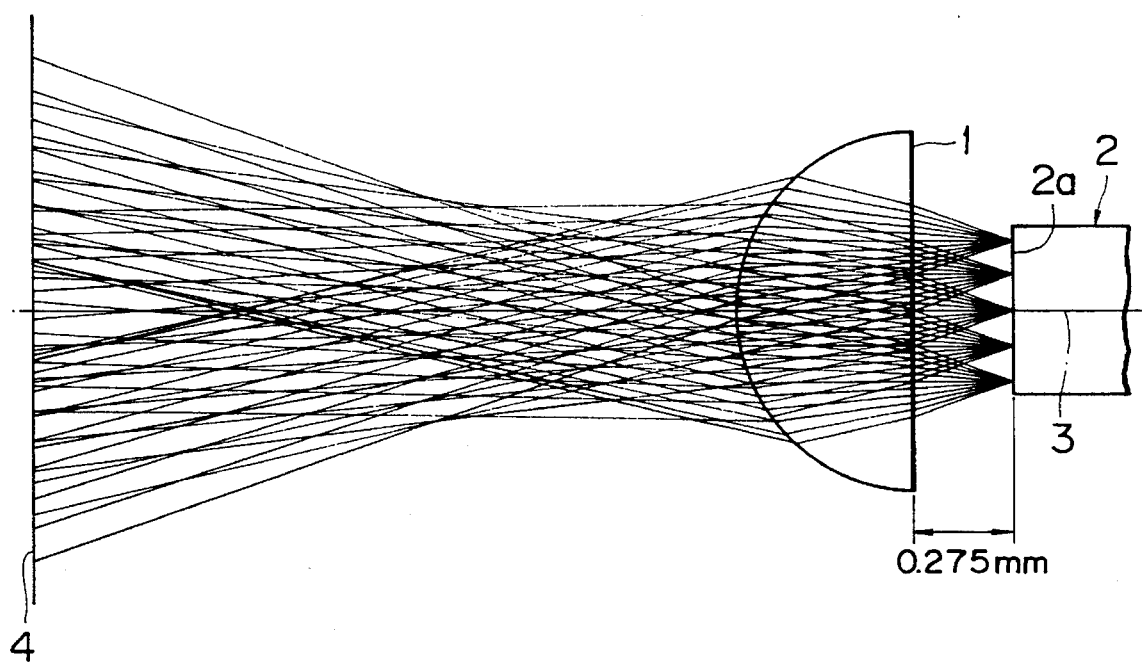
FIG. 2 is a computer graphic view showing an outgoing pattern of laser beams by an optical fiber laser device according to the present invention.

FIG. 2 shows the construction of a tip of an optical fiber laser probe according to the present invention, and one example of distribution patterns of laser beam outgoing strength as the function thereof. In this case, the semispherical lens 1 is made of glass material BK-7 glass ($n_d$=1.516), in which diameter D is 1.0 mm, a diameter d of an optical fiber laser guiding portion is 0.4 mm, and a spacing L between the optical fiber end 2a on the optical axis 3 of the semispherical lens and the plane side of the semispherical lens is 0.275 mm. In the drawings, the light outgoing from the optical fiber end 2a is carried out from five points in view of a model for the convenience's sake. A light outgoing angle (overall angle) of each outgoing light is 40 degrees.

As will be understood from FIG. 2, in the case of this construction according to the present invention, an even outgoing light spot pattern is provided, and there exists no abnormal in-lens reflecting light pattern from which a breakage of a lens occurs.

Since an external portion of a tip of a laser probe constitutes a semispherical lens, it has a convex shape, which can be easily cleaned and removed. Polishing of a semispherical lens is easier than that of other complicated lenses. It can be easily processed into an inexpensive semispherical lens, and in addition, is cheaper than a GRIN lens or the like, thus obtaining the above-described optical effect as well a high economical effect.

Figure 3:
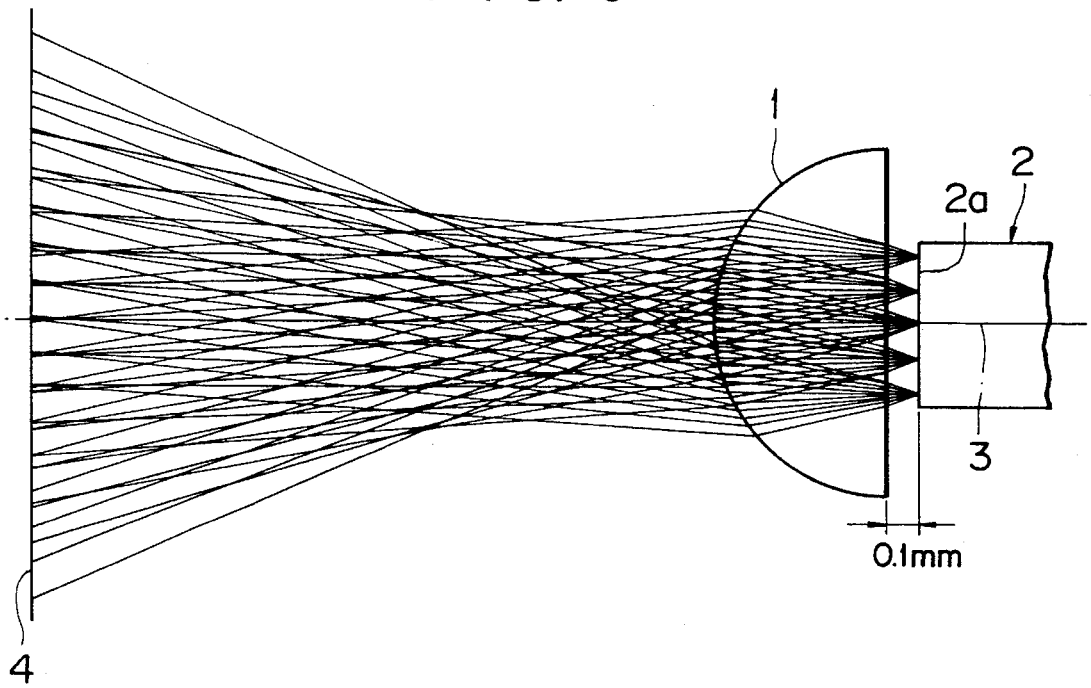
FIG. 3 is a computer graphic view showing a light outgoing pattern in the case of a spacing L between a semispherical lens outside of a scope of the present invention and an end of optical fibers.
Figure 4:
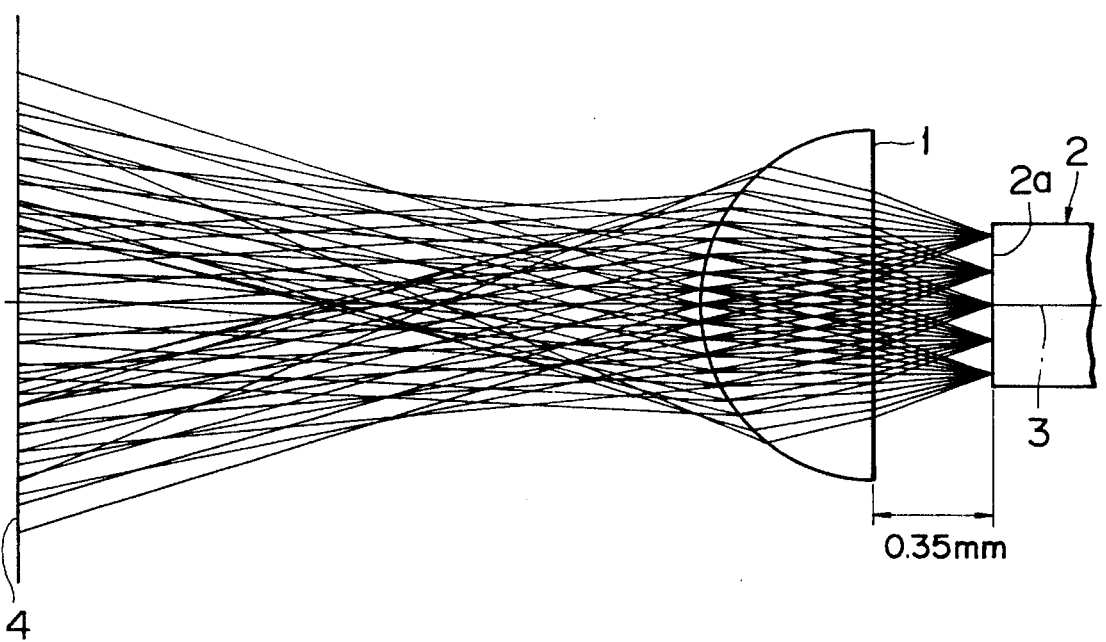
FIG. 4 is a computer graphic view showing a light outgoing pattern in the case of a spacing L between a semispherical lens within a scope of the present invention and an end of optical fibers.
Figure 5:
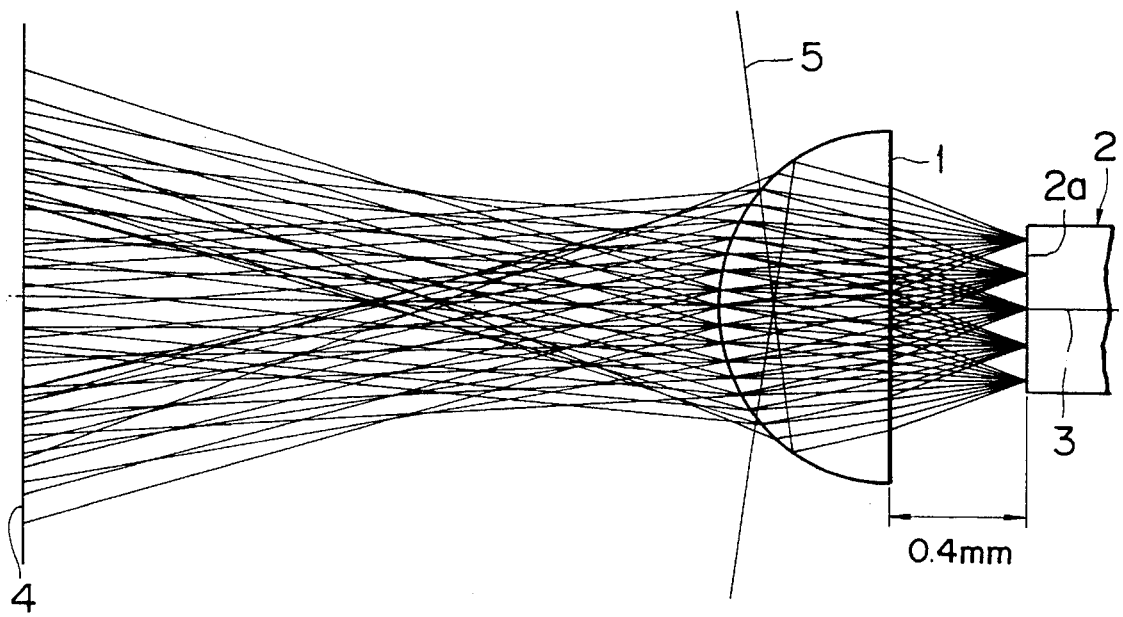
FIG. 5 is a computer graphic view showing a light outgoing pattern in the case of a spacing L between a semispherical lens outside of a scope of the present invention and an end of optical fibers.

FIGS. 3 to 5 show variations of beam patterns in the case where only the spacing L between the semispherical lens 1 and the optical fiber end 2a is changed under exactly the same conditions as in FIG. 2. In FIG. 3, L is 0.1 mm; in FIG. 4, L is 0.35 mm; and in FIG. 5, L is 0.4 mm.

In FIG. 3, which is outside of a scope of the present invention, an irradiation pattern is strong in a center portion and weak in a peripheral portion, showing an uneven pattern. In FIG. 4, which is within a scope of the present invention, a substantially even pattern is shown. In FIG. 5, the pattern is weak in a center portion and strong in a peripheral portion, showing a so-called ring-like "inside-out" pattern, in which an in-lens reflecting light 5 occur, which crosses within the lens and as a result, the focal point within the lens of laser energy is concentrated, possibly resulting in a breakage.

Figure 6:
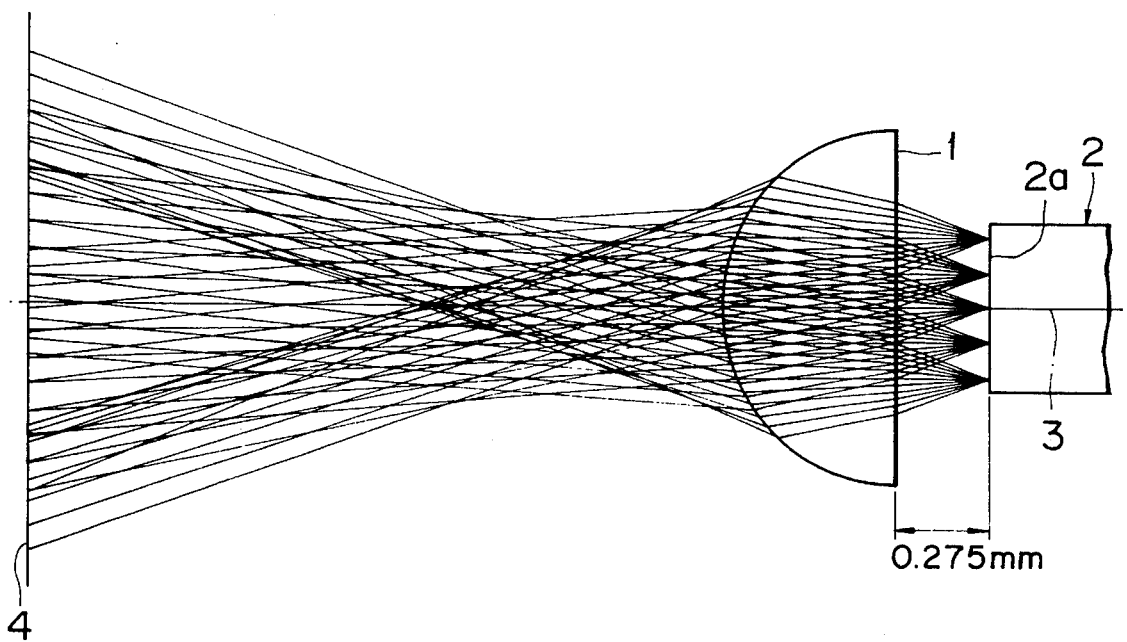
FIG. 6 is a computer graphic view showing a light outgoing pattern in the case of a refractive index $n_d$ of a semispherical lens outside of scope of the present invention.

FIGS. 6 and 7 show the case where other conditions are exactly the same as in FIG. 2 but the refractive index of the semispherical lens 1 is changed to that outside of a scope of the present invention.

FIG. 6 shows the case where the refractive index $n_d$ is 1.6127 (Glass material SK-4). In this case, apparently, the "inside-out" pattern results. FIG. 7 shows the case where a semispherical lens having a higher refractive index, $n_d$=1.8466 (Glass material SF-03), in which case, the outgoing laser beam pattern materially falls into disorder so that it becomes a ring-like configuration and at the same time, an extreme reflecting wave indicative of a laser energy concentration within the lens occurs as shown in FIG. 5, posing an extreme danger of breakage.

Figure 9:
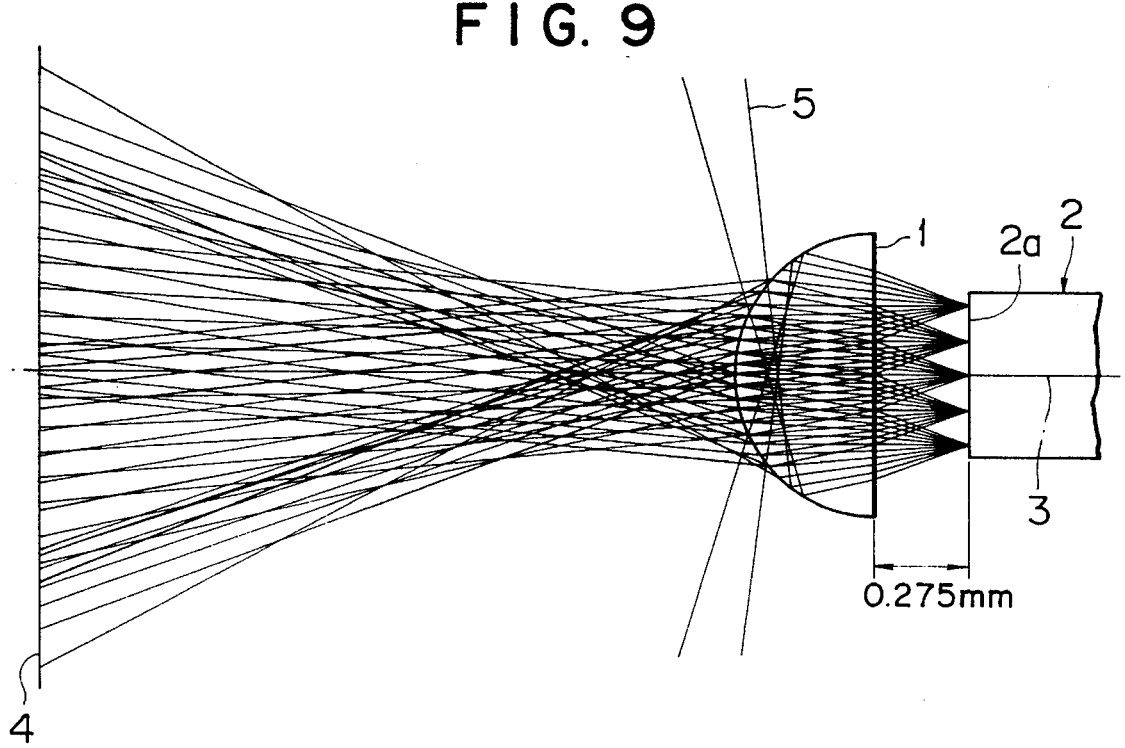
FIG. 9 is a computer graphic view of a light outgoing pattern of an optical fiber laser device outside of a scope of the present invention.
Figure 10:
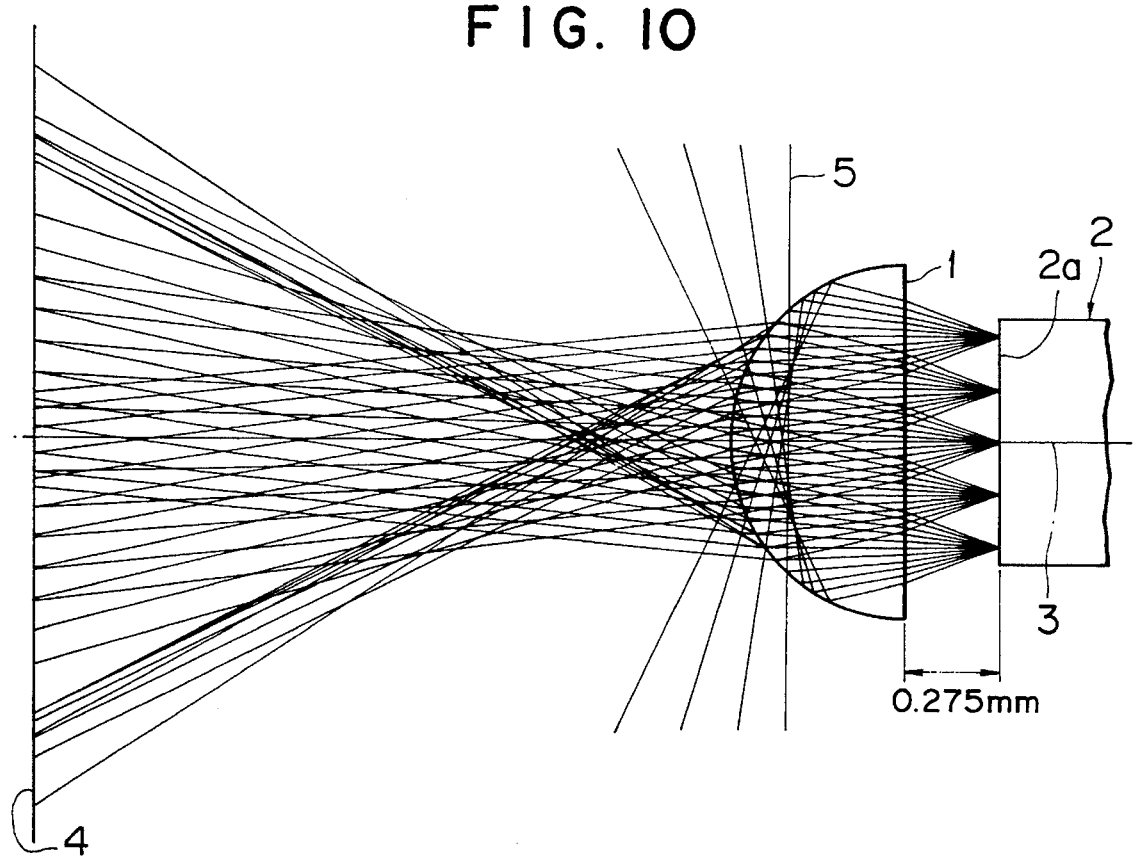
FIG. 10 is a computer graphic view of a light outgoing pattern of an optical fiber laser device outside of a scope of the present invention.

FIGS. 8 to 10 show the cases where the diameter D of the semispherical lens 1 and the diameter d of the optical fiber core from which laser beam goes out are changed to the form of D/d, and in both the cases, the spacing L between the laser beam outgoing end of the optical fiber and the plane side of the lens is 0.275 mm.

FIG. 8 shows the case where D is 1.2 mm, d is 0.4 mm and D/d is 3, which are within the scope of the present invention, showing a good outgoing pattern.

FIG. 9 shows the case where D is 0.8, d is 0.4 and D/d is 2.0. FIG. 10 shows the case where D is 1.0, d is 0.6 and D/d is 1.67, which are outside of the scope of the present invention. In any of these cases, the outgoing pattern 4 falls into disorder as shown in FIGS. 9 and 10, and at the same time, there are a dangerous in-lens reflection and a laser energy concentration point.

Specific embodiments to which the present invention is applied will be described below.

Figure 11:
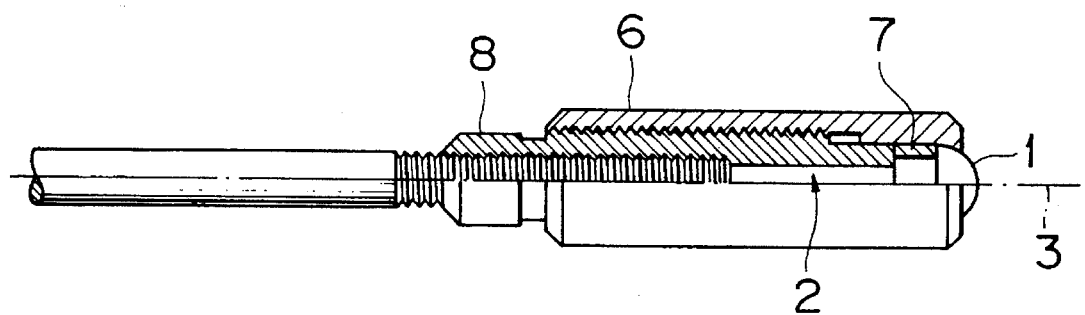
FIG. 11 is a partly cutaway side view of a first embodiment according to the present invention.

FIG. 11 shows a first specific embodiment of an optical fiber laser device according to the present invention used for laser therapy such as a photo dynamic therapy. Reference numeral 2 designates an optical fiber; 1 a semispherical lens; and 6 a semispherical lens housing, in which a semispherical portion of the semispherical lens 1 is projected toward the objective side, in which the contamination on the outer surface of the lens can be easily cleaned and removed. Reference numeral 7 designates a spacing ring between the semispherical lens and the optical fiber 2, and 8 an optical fiber holder in which internal threads of the semispherical lens housing 6 are engaged with external threads of the optical fiber holder 8 so that the spacing ring 7 and the semispherical lens 1 are fixed to keep an adequate spacing between the optical fiber 2 and the semispherical lens 1. It was possible for the optical fiber laser device having the above-described construction to prepare a good and even laser light outgoing pattern.

In this embodiment, the semispherical lens 1 used was made by Glass material BK-7 optical glass having the refractive index of 1.516 and diameter of 1 mm, and the optical fiber 2 used was made by HN-S-FB400 having a core diameter of 400 μm, which is sold by Toray Ind. Inc. The distance between the lens and the end of the optical fiber was 0.275 mm. The surface of the semispherical lens 1 on the objective side is projected from the semispherical lens housing 6, and it has been made sure that the aforesaid surface is easily cleaned with cotton wool impregnated with a solvent, and the contamination is completely removed.

Figure 12:
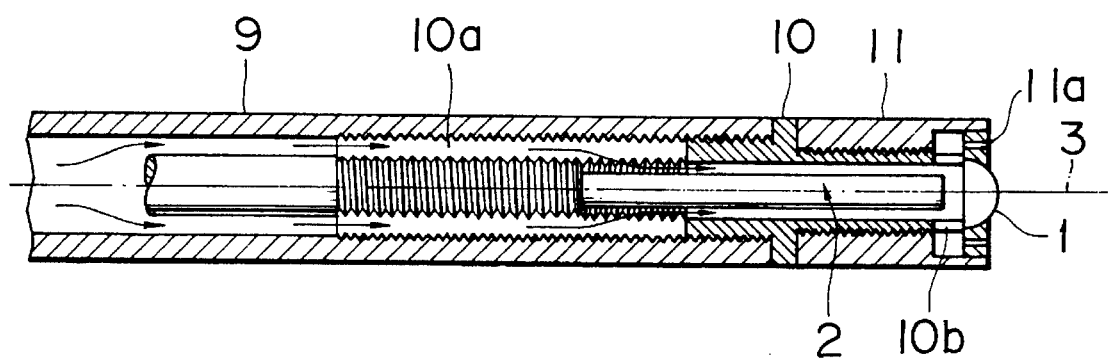
FIG. 12 is a partly cutaway side view of a second embodiment according to the present invention.

FIG. 12 shows a second specific embodiment, which is additionally provided with a contamination preventive construction using fluids such as air. In the second embodiment, a flexible tube 9 is placed on the outside of an optical fiber laser device having the construction substantially similar to that shown in FIG. 11.

In the embodiment, a tube made of polytetrafluoroethylene known as "Teflon" (registered trademark) is used as the flexible tube 9. The fluid which moves forward between the teflon tube 9 placed on the optical fiber 10 and the optical fiber 2 passes through two grooves 10a and 10b provided in the optical fiber holder 10 and goes out of several holes 11a provided in the semispherical housing 11 toward the objective side to prevent contamination of an outer surface of the semispherical lens 1. A pulse excimer laser having a wavelength of 628 nm, 8 mJ and 80 Hz is incident on the optical fiber device according to the above-described embodiment to carry out plural tests. As a result, a breakage of the semispherical lens was not at all observed to prove the effectiveness of the present invention.

According to the present invention, there is obtained an optical fiber laser device having a even laser outgoing pattern, and there has no danger of breaking a lens due to the in-lens focal point concentration of the laser beam. Further, the contamination of the outside of the lens can be easily cleaned and removed. Since an inexpensive semispherical lens is used, economical and inexpensive products can be obtained.

What is claimed is:

1. An optical fiber laser device for photodynamic therapy characterized in that a laser outgoing end of optical fibers whose diameter of a laser guiding portion (core) is d is disposed on a center optical axis on the plane side of a semispherical lens having a diameter D, which is formed of a material which is transparent with respect to a wavelength of a laser beam and of which refractive index $n_d$ is less than 1.6 so that a spacing L therebetween is $0.35 \geq L \geq 0.2$ mm, and the relationship between the diameter D of said semispherical lens and the diameter d of the laser guiding portion (core) is $D/d \geq 2.5$.

* * * * *